United States Patent [19]

Rutherford

[11] Patent Number: 4,468,046
[45] Date of Patent: Aug. 28, 1984

[54] CONVERTIBLE HORSE WAGON

[76] Inventor: Frank E. Rutherford, 1203 Main St., Georgetown, Colo. 80444

[21] Appl. No.: 490,292

[22] Filed: May 2, 1983

[51] Int. Cl.³ .......................... B60D 1/14; B60F 5/00
[52] U.S. Cl. .................................. 280/416; 280/113; 280/491 E; 296/10; 296/35.3
[58] Field of Search ............... 280/113, 114, 115, 116, 280/117, 118, 119, 120, 121, 122, 123, 105, 80 R, 415 R, 416, 462, 491 E; 296/10, 11, 35.3

[56] References Cited

U.S. PATENT DOCUMENTS

| 1,213,868 | 1/1917 | Harris ...................................... 296/10 |
| 3,698,740 | 10/1972 | Chisholm et al. .......... 280/491 E X |
| 4,261,594 | 4/1981 | Corbett et al. ............. 280/415 R X |

FOREIGN PATENT DOCUMENTS 277821 9/1927 United Kingdom ................ 280/416
660393 11/1951 United Kingdom ................ 280/416

Primary Examiner—Joseph F. Peters, Jr.
Assistant Examiner—Mitchell J. Hill
Attorney, Agent, or Firm—Klaas & Law

[57] ABSTRACT

A four wheeled horse wagon which is readily convertible into a two wheeled towing trailer for towing by a motorized vehicle. The horse wagon comprises a main frame apparatus having a goose neck apparatus for mounting a detachable front wheel assembly apparatus. The goose neck apparatus and front wheel assembly apparatus are connected by ball hitch apparatus which provides limited universal swiveling movement of the front wheel assembly apparatus relative the goose neck apparatus to facilitate steering and reduce drawbar loading. Various draw bar apparatus for attaching one or more horses to the horse wagon are described. Removable wagon body apparatus mountable on the main frame means are also described.

17 Claims, 6 Drawing Figures

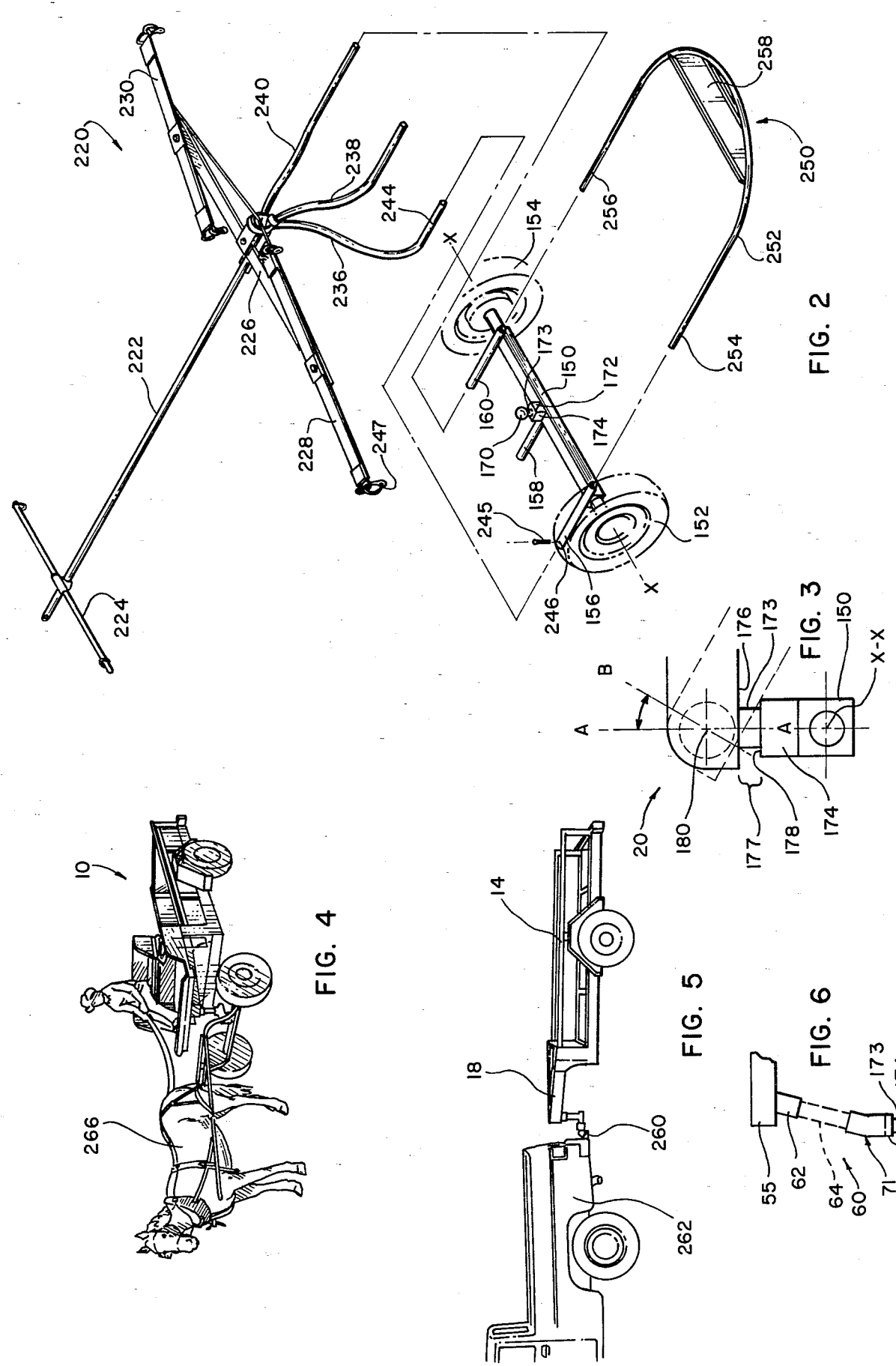

CONVERTIBLE HORSE WAGON

BACKGROUND OF THE INVENTION

The present invention relates generally to horse drawn wagons and more particularly to a horse drawn wagon which may be converted into a two-wheeled trailer for towing behind a mechanized vehicle.

During the past 15 years there has been a renewed interest in the use of draft horses in the United States. The number of draft horses in the United States has steadily increased during this period doubling every 4 to 5 years. Any number of reasons such as the increased cost of fuel oil used in farm vehicles or an interest in turn of the century American culture may be responsible for this phenomenon. There are presently few if any organizations in the United States which mass produce horse drawn equipment. As a result, most horse drawn vehicles are either antique vehicles or home-made vehicles which are fashioned after the horse drawn carriages and wagons of the past. Due to the expense of such vehicles, and the fact that most such vehicles are used for only limited periods of time, it would be generally desireable to provide a horse drawn vehicle which is readily adaptable for towing by a mechanized vehicle, such as a pickup truck. Such a vehicle would prove very convenient in situations where both the horses and the horse wagon must be transported over considerable distances. A wagon of this type would also be economical in that it could be used for hauling, etc., thus saving the owner the expense of acquiring a trailer for such purposes.

Although a four-wheeled horse drawn wagon might conceivably be attached to a pickup truck by using the horse draw bar, such an arrangement is generally undesirable in that the draw bar is generally not adapted for connection to such a vehicle and also because backing and maneuvering a four-wheeled vehicle with a long tongue is very difficult. It would therefore be generally desireable to provide a four-wheeled horse wagon which could be converted into a two-wheeled vehicle for convenient towing by a mechanized vehicle.

SUMMARY OF THE INVENTION

The present invention comprises a four-wheeled horse drawn wagon which is readily adaptable into a two-wheeled towing trailer. The four-wheeled horse drawn wagon comprises a main frame means which may support a removable wagon body or other material loaded thereon. The main frame means is provided with two coaxial wheels mounted at a mid portion thereof for rollingly supporting the main frame. A goose neck means is operably mounted at a forward portion of the main frame means and has a downwardly extending portion which is positioned in spaced apart relationship with the forward most portion of the main frame. A socket portion of a ball hitch means is mounted on the downwardly extending portion of the goose neck and allows the main frame means to be attached to a ball mounted on a towing vehicle such as a pickup truck. The spaced relationship between the downwardly extending portion of the goose neck and the forwardmost portion of the main frame provides clearance between the main frame and the mechanized towing vehicle when the horse wagon is used as a two-wheeled trailer and provides clearance for steering movement of a front end assembly when it is used as a horse drawn wagon.

A front end assembly means is provided for attachment to the socket means mounted on the downwardly extending portion of the goose neck. The front end assembly means comprises a transversely extending axle means having wheels mounted at either end thereof which is substantially as wide as the main frame means. The front end assembly means has a ball means, adapted for mating engagement with the socket means, mounted above a mid portion of the front axle and positioned in close radial proximity thereto. The front end assembly also has draw bar means attached thereto and in the preferred embodiment has detachable draw bar means whereby the horse wagon is easily convertible from a single horse wagon to a multiple horse wagon by exchanging various detachable draw bars.

The horse wagon is steerable due to the co-action of the ball means and the socket means, whereby the front axle is freely pivotal about a tiltable, generally vertical steering axis defined by a line perpendicular to the axis of the front axle and passing through the center point of the ball means. The ball means also co-acts with the socket means to allow limited range, universal, swiveling movement of the ball means whereby the steering means axis may be tilted through a limited range to accommodate uneven or sloping terrain and prevent loading on the horse and draw bar in such conditions. The close radial spacing between the central axis of the front axle and the ball means limits the amount of counteracting torque which must be produced by the horse and draw bar to realign the steering axis to a generally vertical position after traversing such uneven terrain.

Means for counteracting the weight of the draw bar which the horse must carry may be provided such as by a spring or by a counterweight.

A wagon body means may be provided which is readily disengagable from the main frame means to allow use of the main frame with other vehicle body structures such as for example a horse trailer body. The wagon body means may also comprise a front seat means for supporting a wagon driver which is detached or detachable from the wagon body to allow use of the wagon body separately from the seat means. The seat means may be mounted and supported solely on the goose neck means. The wheels of the main frame means may be provided with conventional mechanical or hydraulic brakes which may be controlled with a traditional wagon brake arm or which may be connected to a foot brake pedal such as used in modern mechanized vehicles. The main frame may also be provided with electrical signal lights, etc. which may be conventionally connected to the electrical system of a mechanized vehicle.

BRIEF DESCRIPTION OF THE DRAWING

FIG. 2 is an alternate view of a front end assembly of a four-wheeled horse wagon of the present invention.

FIG. 3 is a detailed elevation view of the ball hitch portion of the four-wheeled horse wagon of the present invention.

FIG. 4 is a perspective view illustrating the four-wheeled horse wagon of the present invention being towed by a horse.

FIG. 5 is a perspective view illustrating use of a portion of the four-wheeled horse wagon of the present invention with a mechanized towing vehicle.

FIG. 6 is an elevation view of an alternate embodiment of a goose neck of the four wheeled horse wagon of the present invention.

DETAILED DESCRIPTION OF THE INVENTION

Figure 1:
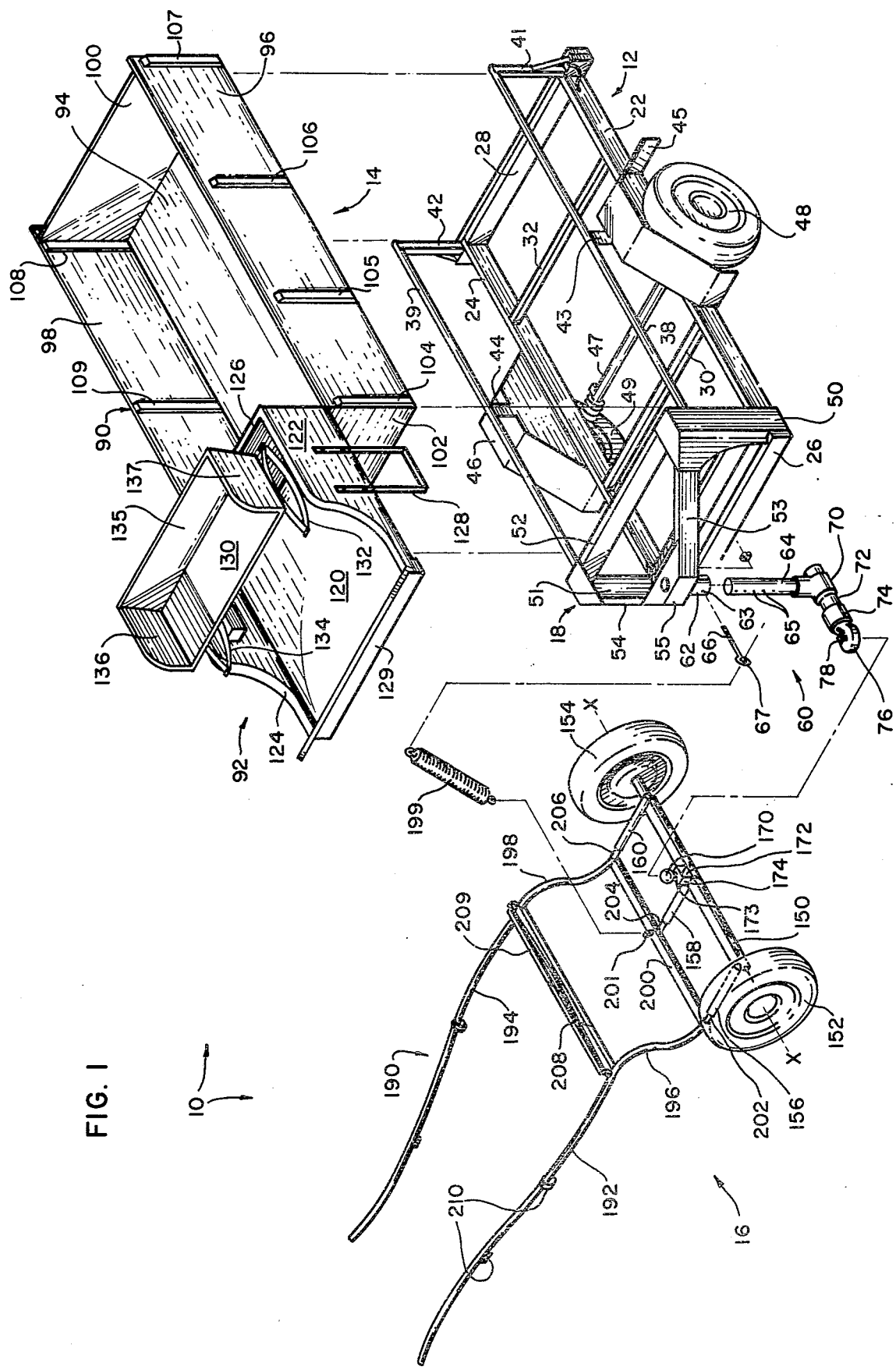
FIG. 1 is an exploded perspective view of a four-wheeled horse wagon of the present invention.

As illustrated by FIG. 1 the convertible horse wagon 10 of the present invention, comprises a main frame means 12 which in the preferred embodiment is a generally rectangular configuration which supports a selectively removable wagon body means 14 having the same general configuration. A removeable front wheel assembly means 16, also referred to herein as a front end assembly means, is detachably mounted to a forward portion of the main frame means 12 by a goose neck means 18 and ball hitch means 20, as shown in FIG. 3.

Referring to FIG. 1 it may be seen that main frame 12 may comprise parallel longitudinally extending frame members 22, 24 positioned in spaced relationship and fixedly attached at either end to front and rear transverse frame members 26, 28 to form a generally rectangular configuration. A plurality of transverse brace members 30, 32 may be weldingly or otherwise fixedly attached to members 22, 24 to provide additional constructural integrity to the frame means.

Longitudinally extending rail members 38, 39 may be provided above longitudinal frame members 22, 24 and supported as by vertical post members 41, 42, wheel skirt posts 43, 44 and goose neck forward vertical post members 50, 51. Vertical post members 41, 42 are weldingly or otherwise rigidly attached to transverse frame member 28. Wheel skirt post 43, 44 may be weldingly attached to wheel skirts 45, 46 which are weldingly attached to longitudinal frame member 22, 24 in covering relationship with rear wheels 48, 49. The rear wheels 48, 49 are journaled at either end of rear axle 47 which is fixedly mounted proximate the longitudinal midpoint of frame members 22, 24.

The main frame means 12 may also be provided with brake means (not shown) such as hydraulic or mechanical brakes which may be conventionally attached to brake control means such as a brake lever (not shown) or foot pedal (not shown) mounted on the wagon body means 14. Conventional signaling means such as brake and turn lights (not shown) may also be provided as on rear transverse frame member 28 and conventionally connected to the electrical system of a motorized towing vehicle when the main frame means is used as a two-wheeled towing vehicle.

Goose neck means 18 is operably mounted on the forwardmost portion of the frame means 12 as by upwardly extending vertical members 50, 51 fixedly attached to the ends of transverse frame member 26 and fixedly connected at upper portions thereof by upper transverse member 52. An upper horizontal forwardly extending portion of the goose neck means 18 may be formed by diagonal members 53, 54 weldingly or otherwise fixedly attached to vertical member 50, 51 at rear end portions thereof and weldingly attached to central connection member 55 at forward end portions thereof. The horizontal portion of the goose neck means provides a clearance distance between the forwardmost portion of the frame means and either a front wheel assembly 16 or towing vehicle attached to goose neck downwardly extending portion 60. In the preferred embodiment this clearance distance is substantially half the length of a front axle means 150 portion of the front wheel assembly 16.

The downwardly extending portion 60 of goose neck means 18 comprises an upper tubular portion 62 fixedly connected to central connection member 55 and extending therethrough. The upper tubular portion 62 telescopingly accepts a lower portion 64. Both upper and lower portions are provided with holes 63, 65 adapted to accept a pin 66 therethrough for selectively holding the lower portion of the goose neck at various elevations with respect to the upper portion 62. Pin 66 may be provided with an eyelet 67 for attachment to a biasing spring as discussed in further detail hereinafter. The goose neck downwardly extending portion 60 is provided with a socket attachment means such as L-shaped coupling member 70 having a longitudinally extending hitch socket arm 72 mounted therein for matingly receiving hitch socket coupling 74 which is in turn fixedly attached to ball hitch socket means 76. The forwardly extending socket arm 72 provides clearance between the goose neck connection member 55 and the rear portion of a towing vehicle such as a pickup truck 262 illustrated in FIG. 4. However, the socket means 76 might also be attached directly at the lower end of the goose neck downwardly extending portion 60, as illustrated in FIG. 6. In this embodiment the goose neck downwardly extending portion 60 may be angled in a forward direction and provided with an angled coupling 71 for providing a vertical alignment between socket means 76 and a ball means. The angle of forward inclination may be on the order of 5° to 15° to provide adequate clearance from a towing vehicle.

As illustrated in more detail in FIG. 3, the socket means 76 is adapted to accept a ball means to form a conventional ball hitch attachment. The socket means 76 may be a conventional ball hitch socket member provided with conventional screw 78 tightening and release means, FIG. 1, for selectively holding a ball means in limited universal pivotal attachment with respect thereto, as discussed in greater detail hereinafter.

As best illustrated in FIG. 1, the wagon body means 14 may comprise a wagon box portion 90 and a seat assembly 92 which in one embodiment may be conventionally attached to the forward end of the box portion such as by brace members and bolts. However, in the preferred embodiment the seat means 92 is detached from the box portion and is separately mounted on the goose neck means as by bolts, etc. The wagon body box portion may comprise a horizontally extending floor member 94 having vertical lateral side members 96, 98, and vertical end and front members 100, 102 attached about the periphery thereof. Stiffening and support members 104–109 etc., may be provided to add structural support to the side members and to prevent abrasion between the side members and the frame rail members 38, 39. The wagon seat assembly may comprise a base member 120, having lateral side members 122, 124, 126 and kick board 129 attached about the periphery thereof. One of the lateral side members may be provided with step means 128 to facilitate access to the seat assembly. A horizontally extending seat 130 supported on lateral side members 122, 124 by springs 132, 134 may be provided with a vertical back member 135 and arm members 136, 137.

In the preferred embodiment both the seat assembly 92 and the box portion of the wagon body means are disconnectable from the main frame means permitting the use of any number of wagon body configurations such as, for example, a horse trailer configuration, a flat bed configuration, etc. However, the box portion may also be fabricated in a nonremovable form which is permanently attached to the main frame.

As illustrated in FIG. 1, the removable front wheel assembly means 16 comprises a front axle means 150 having front wheels 152, 154, attached at either end thereof in coaxial alignment with the central longitudinal axis XX thereof. Longitudinal extending coupling members 156, 158, 160 may be affixed in transverse relationship with the front axle means at a mid portion and at either end thereof as by welding or other fixed attachment means well known in the art. A ball hitch means 170 is affixed as by weldment of a ball mounting means 172 to the mid portion of the axle means 150 in close radial proximity to the longitudinal axis XX thereof. As illustrated by FIG. 3, the ball mounting means may comprise a ball mounting neck portion 173 to which the ball hitch means is affixed and a block portion 174 rigidly attached to the neck portion and weldingly attached to the axle means 150. The ball hitch means 170 mates with the socket means 76 attached to goose neck means 18 in detachable swiveling relationship about a central ball hitch pivot point 180. The ball hitch pivot point 180 is coincident with a central steering axis AA defined by a line passing through the center of ball hitch means 174 and intersecting the longitudinal axis XX of front axle means 150. In the preferred embodiment the distance between point 180 and axis XX is less than 8 inches. The pivot point 180 is also coincident with an axis of symmetry BB of the socket means 76. The lower edge surface 176 of the socket means 76 is provided at a sufficient clearance distance 177 from the upper portion 178 of block portion 174 to allow substantial swiveling movement between the front end assembly means 16 and the socket means. In the preferred embodiment clearance distance 177 is sufficient to allow the steering axis AA to pivot universally at least 30° with respect to the socket axis of symmetry BB. In addition to providing swiveling movement between the front wheel assembly means and the socket means the ball means and socket means also co-act to allow 360° rotational movement of the front axle means 150 about steering axis AA.

As illustrated in FIG. 1, a single horse draw bar means 190 may be provided by two spaced apart longitudinal draw bars 192, 194 having relief bend portions 196, 198 at the rearward end thereof and having a transverse cross member 200 fixedly attached thereto. The cross member 200 may have a spring attachment device 201 provided at a central portion thereof for receiving an end of a spring means 199 which is attached at its opposite end to pin 66, ring portion 67. Coupling portions 202, 204, 206 extend rearwardly on the member 200 and are adapted to be slidingly acceptable with front end assembly coupling members 156, 158, 160. A brace member 208 may also be provided as a mounting base for a conventional single tree 209 and to hold the bars, 192, and 194 in spaced relationship. Harness connection means 210 may be provided for attaching a horse 266 in a conventional manner as illustrated in FIG. 4. The spring 199 attached between the cross bar 200 and goose neck pin 66 is of a length and tension such that it counter acts the weight of bar 192, 194 when the wagon is in a normal operating position on substantially horizontal terrain. In the preferred embodiment the bars 192, 194 should exert a slight amount of downward force, on the order of 4 or 5 pounds, when the wagon is positioned on even horizontal terrain.

An alternate construction of the front end assembly is illustrated in FIG. 2 in which a double horse draw bar means 220 having a single longitudinal draw bar 222 supporting a forward transverse neck yolk bar 224 and a set of "double trees" comprising a rear transverse bar 226 having rear transverse pivot bars or "eveners" 228, 230 pivotally mounted thereon is used in place of the single horse draw bar means 190. Coupling bars 236, 238, 240 having relief bends therein mate with coupling portions 156, 158, 160 as described above. The coupling bars 236, 238, 240 may be held in attachment with mating coupling members 156, 158, 160 as by pins 245, and holes 244, 246. Harness connection means 247 may be conventionally provided on the draw bar means 220 for connecting 2 horses thereto. A counter weight means 250 which in one embodiment comprises a U-shaped bar 252 having coupling ends 254, 256, for mating attachment with coupling members 156, 160 is provided with a weight 258 which counteracts the weight of the draw bar means.

In operation the horse wagon with front end assembly means attached may be harnessed to a horse 266 as illustrated in FIG. 4, and operated as a conventional horse wagon. The horse wagon 10 may also be used without the front wheel assembly 16 or wagon body means 14 to provided a low bed two-wheeled trailer which may be attached to a power vehicle such as a pickup 262 having a conventional ball mounted on its bumper 260. The wagon 10 might also be used as a trailer with the wagon body means mounted thereon without the driver seat assembly 92.

Various wagon body structure may be used with the frame means other than those illustrated herein. For example, a horse trailer body might be provided to allow the horse wagon 10 to be converted into a horse trailer.

It is contemplated that the inventive concepts herein described may be variously otherwise embodied and it is intended that the appended claims be construed to include alternative embodiments of the invention except insofar as limited by the prior art.

What is claimed is:

1. A four-wheeled horse wagon which is readily adaptable into a two-wheeled towing trailer comprising:
    main frame means for supporting a wagon load having two coaxially aligned wheel means operably mounted at a mid portion of the main frame for rollingly supporting said main frame;
    goose neck means operably mounted on a forward portion of said main frame means for providing clearance between said forward portion of said main frame means and a front end assembly means;
    front end assembly means for attachment to said goose neck means for steerably rollingly supporting the front end of said main frame means having a transversely extending front axle means for supporting wheels and having front wheels journaled at either end thereof in coaxial alignment with the central longitudinal axis of said front axle means, the front end assembly means being substantially as wide as said main frame means;
    draw bar means operably attached to said front end assembly means for attaching at least one horse to the horse wagon;
    ball hitch means, comprising a ball means and a socket means for mating, selectively disengagable attachment one with another, for providing limited universal pivotal attachment between said goose neck means and said front end assembly means to allow free pivotal movement of said front axle means about a tiltable generally vertical steering axis, said steering axis being defined by a line substantially perpendicular to said central longitudinal axis of said front axle means and substantially coincident with a center point of said ball means, for steering the horse wagon and to provide limited swiveling movement between said ball means and said socket means to prevent excessive loading on said draw bar in uneven terrain or surfaces of changing grade.

2. The invention of claim 1 wherein said ball means is mounted substantially at the mid length of said front axle means proximate said central longitudinal axis of said front axle means for providing said front end assembly means with a hitch pivot point coincident with said steering axis in close proximity to said front axle means whereby the moment arm defined by the perpendicular distance between said hitch pivot point and said central longitudinal axis of said front axle means is extremely short relative the length of said draw bar means;

and wherein said socket means is mounted on said goose neck means at a position whereby it is alternatively connectable and disconnectable with a ball portion of a mechanized towing vehicle hitch, whereby the main frame means of said four wheel horse wagon is operable as a two-wheeled towing trailer.

3. The invention of claim 2 wherein the distance between said central longitudinal axis of said front axle means and said hitch pivot point is less than 8 inches.

4. The invention of claim 2 wherein said ball means and said socket means co-act to provide at least 180° rotational movement of said front end assembly means relative said goose neck means about said tiltable, generally vertical steering axis.

5. The invention of claim 4 wherein said tiltable generally vertical steering axis is tiltable from a centered position in coaxial alignment with an axis of symmetry of said socket means to a plurality of tilted positions wherein said steering axis is angularly displaced relative said axis of symmetry of said socket means and wherein the amount of angular displacement of said steering axis from said axis of symmetry of said socket means in said plurality of tilted positions comprises a range from 0° to at least 30°.

6. The invention of claim 1 wherein the distance from said forward portion of said main frame means whereat said goose neck means is mounted to said ball hitch means is greater than half the length of said front axle means.

7. The invention of claim 1 wherein said goose neck means comprises a downwardly extendable portion of selectively adjustable length.

8. The invention of claim 1 wherein said draw bar means comprises a selectively removeable draw bar.

9. The invention of claim 8 wherein said selectively removeable draw bar comprises a single horse draw bar.

10. The invention of claim 8 wherein said selectively removeable draw bar comprises a multiple horse draw bar.

11. The invention of claim 1 further comprising draw bar weight counteracting means for counteracting the weight of said drawbar means supported by a horse hitched to the drawbar means.

12. The invention of claim 11 wherein said drawbar weight counteracting means comprises a counterweight.

13. The invention of claim 11 wherein said drawbar weight counteracting means comprises at least one spring.

14. The invention of claim 1 further comprising wagon body means removeably mounted on said frame means for holding articles to be carried in the horse wagon.

15. The invention of claim 14 wherein said wagon body means comprises a seat means for supporting a wagon driver supported by an upper portion of said goose neck means.

16. The invention of claim 15 wherein said seat means is selectively detachable from an upper portion of said goose neck means.

17. The invention of claims 1, 2, 3, 4, 5, 6, 7, 8, 9, 10, 11, 12, or 13 further comprising seat means operably mounted on said goose neck means for supporting a wagon driver at a position substantially directly above said ball hitch means whereby the horse wagon is steerable without displacement of the driver's hands relative associated horse guiding reins or relative said horse wagon.

* * * * *